US006602479B2

(12) United States Patent
Taniguchi et al.

(10) Patent No.: US 6,602,479 B2
(45) Date of Patent: Aug. 5, 2003

(54) EXHAUST GAS PURIFYING CATALYST

(75) Inventors: Shigeyoshi Taniguchi, Himeji (JP); Makoto Horiuchi, Himeji (JP)

(73) Assignees: ICT Co., Ltd., Osaka (JP); International Catalyst Technology, Inc., Ridgefield Park, NJ (US)

( * ) Notice: Subject to any disclaimer, the term of this patent is extended or adjusted under 35 U.S.C. 154(b) by 50 days.

(21) Appl. No.: 09/885,503

(22) Filed: Jun. 20, 2001

(65) Prior Publication Data

US 2002/0015674 A1 Feb. 7, 2002

(30) Foreign Application Priority Data

Jun. 27, 2000 (JP) ....................................... 2000-192934

(51) Int. Cl.[7] ................................................ B01D 53/56

(52) U.S. Cl. .................... 423/239; 423/213.5; 502/303; 502/304; 502/325; 502/333; 502/334; 502/339; 502/350

(58) Field of Search ........................... 423/213.5, 239.1; 502/303, 304, 325, 327, 328, 333, 334, 339, 349, 350, 351

(56) References Cited

U.S. PATENT DOCUMENTS

| | | | | |
|---|---|---|---|---|
| 4,927,799 A | | 5/1990 | Matsumoto et al. | 502/303 |
| 5,015,617 A | | 5/1991 | Chata et al. | 502/304 |
| 5,490,977 A | * | 2/1996 | Wan et al. | 423/210 |

FOREIGN PATENT DOCUMENTS

| | | | |
|---|---|---|---|
| EP | 0 443 765 A1 | 8/1991 | B01J/37/02 |
| EP | 0 955 267 A1 | 11/1999 | C01G/25/00 |
| JP | 7-60117 | 3/1995 | B01J/23/58 |
| WO | WO 97/30777 | 8/1997 | B01D/53/94 |

* cited by examiner

*Primary Examiner*—Stanley S. Silverman
*Assistant Examiner*—Maribel Medina
(74) *Attorney, Agent, or Firm*—Fish & Richardson P.C.

(57) ABSTRACT

An exhaust gas purifying catalyst having a refractory three-dimensional structure coated with a catalytically active component comprising at least one kind of noble metals, a refractory inorganic oxide, and a zirconium oxide containing cerium and lanthanum, the crystal structure of the zirconium oxide containing cerium and lanthanum being a tetragonal structure of zirconium oxide.

16 Claims, 2 Drawing Sheets

20.000
15.000
10.000
5.000
0
Intensity (cps)
20.000
40.000
60.000
80.000
2θ [°]

Intensity (cps)
10000
8000
6000
4000
2000
0
20000
40000
60000
80000
2θ [°]

EXHAUST GAS PURIFYING CATALYST

BACKGROUND OF THE INVENTION

1. Field of the Invention

This invention relates to an exhaust gas purifying catalyst for simultaneous removal of carbon monoxide (CO), hydrocarbon (HC), and nitrogen oxides ($NO_X$), which are harmful component contained in the exhaust gas from an internal combustion engine, and a method for the purification of exhaust gases by the use of the catalyst.

2. Description of Related Art

Various inventions have been proposed concerning the exhaust gas purifying catalyst for removing harmful components contained in the exhaust gas emitted from the internal combustion engine (JP-A-7-60117).

In recent years, various studies including the improvement of an engine itself are now under way with a view to complying with the global trend toward intensification of the regulations on the exhaust gas. One of the most leading methods is to expedite the ignition of a catalyst by approximating the position of the catalyst closely to the engine side thereby enabling the temperature of the catalyst bed immediately, after the start of the engine, to be elevated as quickly as possible. This method indeed excels in the ability to purify the exhaust gas immediately after the start of the engine but yet entails the disadvantage that it requires a catalyst having a higher heat resistant property because it is used in the proximity of the engine and exposed to a higher temperature than ever.

Technique of fuel cooling aimed at retaining the temperature of a material such as catalyst below a stated level has been adopted for the purpose of guaranteeing a part. In recent years, a demand for heat resistant property of the catalyst has been gaining because the fuel cooling tends to dwindle in response to the request for a lower fuel cost. In this circumstance, the conventional catalysts do not fully meet the demand for the heat resistant property.

SUMMARY OF THE INVENTION

We have pursued a diligent study for the purpose of fulfilling this object and taken notice of an oxygen storage material capable of adsorbing and desorbing oxygen, which is one of the most important components in three-way catalysts intended for use in gasoline vehicles. Various types of cerium oxide have been heretofore used as oxygen storage materials. To date, techniques such as addition of zirconium oxide, addition of the oxide of a rare earth element, or formation of a solid solution of cerium oxide in zirconium oxide have been disclosed with a view to enhancing the heat resistant quality of cerium oxide to store oxygen (Patent No. 2659796 in Japan). In these techniques, the ability to store oxygen per unit amount of cerium oxide reaches the maximum, when cerium oxide is doped into zirconium oxide, in a comparatively low range of 400° C. to 500° C.

Further, it has been ascertained that the abilities to store oxygen and heat resistant properties are enhanced more by doping cerium oxide into zirconium oxide in combination with some other rare earth oxides, particularly lanthanum oxide rather than by forming a solid solution of cerium oxide solely in zirconiumoxide. In the conventional oxygen storage materials, however, when cerium oxide or lanthanum oxide are doped in zirconium oxide, the components does not fully dope and thereby give birth to independent cerium oxide and the like, with the result that the produced solid solution assumes a heterogeneous crystal structure.

This invention has developed a catalyst having higher heat resistant property by using oxygen storage materials having a higher heat resistant property as described below and a method for purifying exhaust gases by the use of this catalyst. To be specific, the catalyst uses, as the oxygen storage material, a composite oxide with a homogenous tetragonal crystal structure of zirconium oxide, which is produced by doping cerium oxide and lanthanum oxide into zirconium oxide without forming independent cerium oxide or the like. Incidentally, it has been also ascertained that this composite oxide manifests higher oxygen storage ability at temperatures in the range of 400° C. to 500° C., even after treatments at temperatures exceeding 900° C. in air, than the conventional oxygen storage materials.

The object of this invention, therefore, is accomplished by an exhaust gas purifying catalyst formed by coating a refractory three-dimensional structure with a catalytically active component containing at least one kind of noble metals, a refractive inorganic oxide, and a zirconium oxide containing cerium and lanthanum, characterized by the fact that the crystal structure of the zirconium oxide containing cerium and lanthanum is a tetragonal structure of zirconium oxide.

The object of this invention is also accomplished by a method for simultaneously purifying carbon monoxide, hydrocarbon, and nitrogen oxide contained in the exhaust gas emitted from an internal combustion engine, particularly a gasoline engine, by the use of the catalyst mentioned above.

According to this invention, carbon monoxide, hydrocarbon, and nitrogen oxide, which are contained in the exhaust gas emitted from the internal combustion engine such as the gasoline engine in an automobile, are simultaneously removed. Further, the catalyst of this invention excels in heat resistant property and durability because it comprises zirconium oxide containing cerium and lanthanum.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DETAILED DESCRIPTION OF THE PREFERRED EMBODIMENTS

Figure 1:
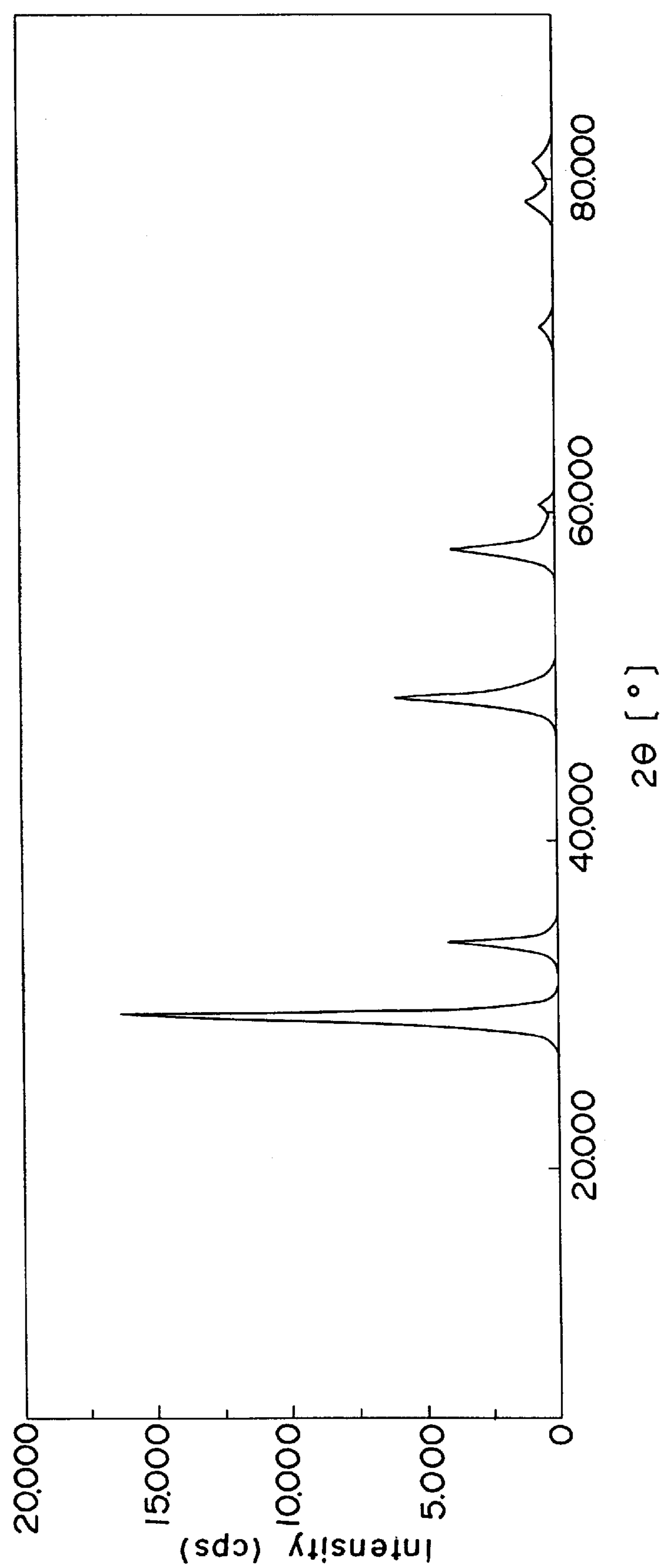
FIG. 1 is a chart obtained by the X ray diffraction of the zirconium oxide containing cerium and lanthanum used in this invention.

Example of the noble metal to be used in this invention may include at least one member selected from the group consisting of palladium, platinum, rhodium and a mixture thereof. The form of the noble metal is not restricted but only required to have catalytic activity. The amount of the noble metal to be used may comprise from 0.05 to 30 g, preferably from 0.15 to 20 g, per liter of a refractory three-dimensional structure. If this amount drops below 0.05 g, the shortage will be at a disadvantage in manifesting no sufficient catalytic activity. Conversely, if the amount exceeds 30 g, the excess will be at a disadvantage in bringing no proportionate addition to the catalytic activity. Here, the amount of such catalyst component as a noble metal to be used per liter of the structure is expressed based on the apparent volume of the molded structure itself when the catalyst component itself is molded or based on the apparent volume of the structure when catalyst components are deposited.

The refractory inorganic oxide (excepting the zirconium oxide containing cerium and lanthanum and alkaline earth metal oxides) may be any of the substances, which are generally used as a catalyst carrier. Examples of such substances may include α-alumina, γ, δ, η, θ or like active alumina, titania, composite oxides of zirconia, titania, silica, or the like, such as alumina-titania, alumina-zirconia, titania-zirconia, and the like. Among other conceivable refractory inorganic oxides, the active alumina is used particularly advantageously. The amount of the refractory inorganic oxide to be used may comprise from 10 to 300 g, preferably from 50 to 250 g, per liter of the structure. If this amount drops below 10 g, the shortage will be at a disadvantage in not enabling the noble metal to be sufficiently dispersed and preventing the produced catalyst from acquiring sufficient durability. Conversely, if this amount exceeds 300 g, the excess will be at a disadvantage in adding to the pressure loss of the exhaust gas.

The zirconium oxide containing cerium and lanthanum used in this invention exhibits a tetragonal crystal structure of zirconium oxide by X-ray diffraction pattern. In this analysis, the oxide used in this invention shows only the peak of the tetragonal zirconium oxide, while the conventional zirconium oxide containing cerium and lanthanum shows peaks of various independent oxides including cerium oxide. In other words, the oxide of this invention shows only a tetragonal crystal structure.

In the zirconium oxide containing cerium and lanthanum, generally (a) the weight ratio of cerium to zirconium, i.e. cerium as $CeO_2$: zirconium as $ZrO_2$, is in the range of 1:8 to 1:1, preferably 1:5 to 1:1 and (b) the weight ratio of lanthanum to zirconium, i.e. lanthanum as $La_2O_3$: zirconium as $ZrO_2$, is in the range of 1:1.5 to 1:60, preferably 1:1.5 to 1:40.

The method for producing the zirconium oxide containing cerium and lanthanum may include the following two kinds of method. The method, however, may deviate from such typical methods without departure from the spirit of this invention.

(1) A method which comprises hydrolyzing a zirconium solution such as of zirconium oxychloride thereby obtaining zirconium hydroxide, adding solutions of compounds of cerium and lanthanum thereto and mixing them together, neutralizing the resultant mixture by addition of an alkali, then washing, drying, and calcining the product of neutralization.

(2) A method which comprises mixing a zirconium solution such as of zirconium nitrate, a cerium solution such as of cerium nitrate, and a lanthanum solution such as of lanthanum nitrate, neutralizing the resultant mixture by addition of an alkali, and then washing, drying, and calcining the product of neutralization.

As respects the individual amount of the catalyst components, the amount of noble metal may comprise from 0.05 to 30 g, that of cerium as reduced to $CeO_2$ from 10 to 100 g, that of zirconium as $ZrO_2$ from 10 to 100 g, that of lanthanum as $La_2O_3$ from 0.1 to 50 g, and that of refractory inorganic oxide from 10 to 300 g per liter of the structure, respectively. Incidentally, the respective amounts of cerium, lanthanum, and zirconium are those of the relevant elements that are included in the amount of the zirconiumoxide containing cerium and lanthanum.

Further, it is commendable to use an alkaline earth metal oxide in the amount generally in the range of 0.1 to 50 g, preferably 1 to 30 g, per liter of the structure. If this amount drops below 0.1 g, the shortage will be at a disadvantage in that the catalyst containing Pd manifests only insufficient heat resistant property. Conversely, if the amount exceeds 50 g, it will be at a disadvantage in not bringing any additional performance proportionate to the excess.

The amount of the zirconium oxide containing cerium and lanthanum to be used may comprise from 5 to 250 g, preferably from 10 to 200 g, per liter of the structure. If this amount drops below 5 g, the shortage will be at a disadvantage in that the catalyst suffers deficiency in durability and OSC (Oxygen Storage Component) capacity. Conversely, if the amount exceeds 250 g, the excess will be at a disadvantage in increasing the pressure loss of the exhaust gas.

The catalyst containing Pd as the noble metal preferably contains an alkaline earth metal oxide, besides the catalyst components mentioned above, from the viewpoint of durability and the ability to purify $NO_X$. Examples of the alkaline earth metal oxide may include the oxides of barium, magnesium, calcium, and strontium. Among other alkaline earth metals mentioned above, barium proves particularly advantageous.

As respects the individual amount of each of the catalyst components to be deposited, the amount of a noble metal may comprise from 0.05 to 30 g, that of cerium as reduced to $CeO_2$ from 10 to 100 g, that of zirconium as $ZrO_2$ from 10 to 100 g, that of lanthanum as $La_2O_3$ from 0.1 to 50 g, that of a refractory inorganic oxide from 10 to 300 g, and that of an alkaline earth metal oxide from 0.1 to 50 g per liter of the structure, respectively. Incidentally, the respective amounts of cerium, lanthanum, and zirconium are those of the relevant elements that are included in the amount of the zirconium oxide containing cerium and lanthanum.

The refractory three-dimensional structure that is coated with the catalyst components mentioned above may be a honeycomb carrier, preferably an integrally molded honeycomb structure. Examples of this structure may include a monolithic honeycomb carrier, a metal honeycomb carrier, and a plug honeycomb carrier.

The monolithic honeycomb may be a honeycomb carrier. Particularly the honeycomb carriers using cordierite, mullite, α-alumina, zirconia, titania, titanium phosphate, aluminum titanate, betallite, spondumene, aluminosilicate, and magnesium silicate are commendable. Among other honeycomb carriers enumerated above, those of cordierite quality prove particularly preferable. Besides, integrally molded structures using such oxidation proof heat resistant metals, as stainless steel and Fe—Cr—Al alloy are usable.

Such a monolithic carrier is produced by methods of extrusion molding or winding a sheet like element into a tight roll. The cell shape for gas passage may be a hexagon, tetragon, triangle, or corrugation, whichever fits the occasion best. The carrier is usable satisfactorily when the cell density (the number of cells per unit cross sectional area, 6.45 $cm^2$ (1 square inch)) may comprise from 100 to 1500 cells, preferably from 200 to 900 cells.

In this invention, the method for coating the carrier with the catalyst components is not restricted. Impregnation method is generally used favorably.

The catalyst according to this invention can be prepared by the following method, for example. The preparation is effected by first placing the powders of a refractory inorganic oxide such as alumina and the zirconium oxide containing cerium and lanthanum in the aqueous solution of a prescribed amount of the nitrate, for example, of a noble metal such as platinum, thoroughly mixing them together till impregnation of the powder components with the solution, then drying the product of impregnation at a temperature of 80° C. to 250° C., preferably of 100° C. to 150° C., and subsequently calcining the dried weight at a temperature of 300° C. to 850° C., preferably of 400° C. to 700° C., for a period of 0.5 to 5 hours, preferably of 1 to 2 hours. Where Pd is contained as the noble metal, it is commendable to use an alkaline earth metal oxide. Such an alkaline earth metal oxide or the salts thereof, like nitrate or acetate, are added at this stage. Where all the oxides are used except for the noble metal, the process may omit the drying and calcining steps and proceed directly to the subsequent wet pulverizing step.

Next, the produced powder is wet pulverized into slurry using a ball mill. The structure made of cordierite is impregnated with the resultant slurry of a catalytic composition, drained to expel excess slurry, then dried at a temperature of 80° C. to 250° C., preferably of 100° C. to 150° C., and optionally calcined at a temperature of 300° C. to 850° C., preferably of 400° C. to 700° C., for a period of 0.5 to 3 hours, preferably of 1 to 2 hours. The amount of the catalytic active component to be deposited may comprise from 30 to 400 g per liter of the catalyst.

Preparing slurries of one same or different composition as described above and impregnating the structure with the slurries may produce a multi-layer coat. It is further permissible to effect the impregnation afterward as with the aqueous solution of the salt of a noble metal.

The catalyst of this invention excels in the ability to purify simultaneously carbon monoxide, hydrocarbon, and nitrogen oxide, which are contained in the exhaust gas emitted from an internal combustion engine, particularly a gasoline engine.

The catalyst is preferably mounted in an exhaust pipe near the engine from the viewpoint of hydrocarbon oxidation.

EXAMPLE

Now, this invention will be described more specifically below with the examples. This invention is not limited to these examples but may be embodied otherwise without departure from the spirit of this invention.

Referential Example

Figure 2:
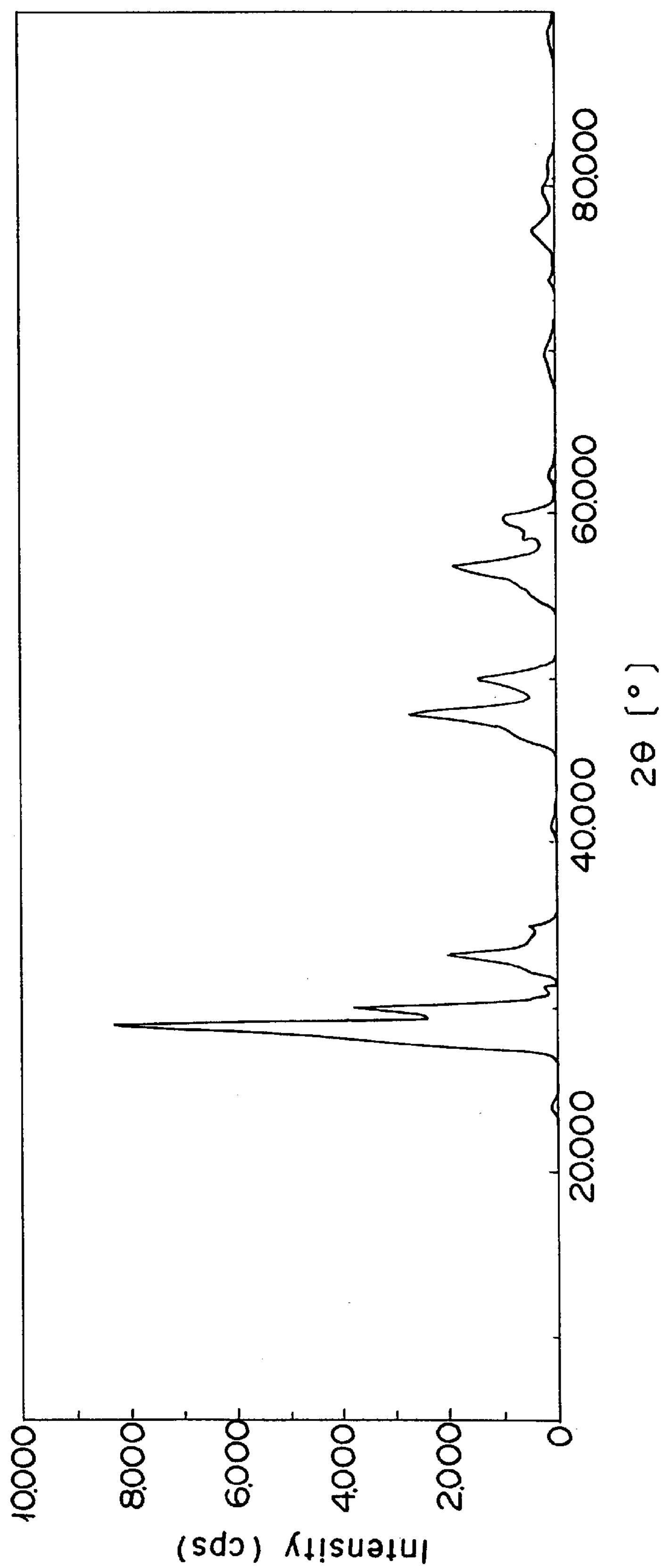
FIG. 2 is a chart obtained by the X ray diffraction of the conventional zirconium oxide containing cerium and lanthanum.

FIG. 1 shows the spectrum pattern, produced by the X-ray diffraction, of the zirconium oxide containing cerium and lanthanum in this invention, and FIG. 2 the spectrum pattern of the conventional zirconium oxide containing cerium and lanthanum. In FIG. 2, it is noted that the conventional oxide revealed the peaks of various independent oxides including cerium oxide. In FIG. 1, it is noted that the oxide used in Example 1 revealed only a peak of the tetragonal crystal structure of zirconium oxide. Other oxides of the present invention also reveal same results as in FIG. 1. Such oxides were evaluated after each the samples had been aged in air at 1000° C. for 10 hours.

Next, the zirconium oxide containing cerium and lanthanum in this invention and the conventional zirconium oxide containing cerium and lanthanum are compared in the amount of oxygen stored that expresses the ability to adsorb and desorb oxygen. The results are shown in Table 1.

TABLE 1

| Oxide | Amount of oxygen stored (ml $0_2$/g $CeO_2$) |
|---|---|
| Conventional oxide | 6.1 |
| Present Oxide | 19.5 |

Method for determination: A given sample was reduced in $H_2$ at 450° C. for 30 minutes and the product of reduction was impulsed with $0_2$ to determine the amount of $0_2$ consumed consequently.

It is clear from Table 1 that the oxide used in this invention had about three times as large ability to store oxygen as compared with the conventional oxide. The ability was evacuated after the sample had been aged in air at 1000° C. for 10 hours.

Example 1

A zirconium-cerium-lanthanum composite oxide (Powder A1) was obtained by hydrolyzing a zirconium oxychloride solution thereby obtaining zirconium hydroxide, adding an aqueous nitric acid solution of cerium and lanthanum to the zirconium hydroxide and mixing them together, neutralizing the resultant mixture by addition of an alkali, washing, drying at 120° C. for two hours and calcining at 700° C. for one hour the product of neutralization, with the relevant components used in amounts calculated to form a weight ratio of 40 g of zirconium oxide, 20 g of cerium oxide, and 15 g of lanthanum oxide.

A quantity of 40 g of Powder A1 was impregnated with an aqueous palladium nitrate solution containing 2 g of palladium. Thereafter, the impregnated composite oxide was dried thoroughly at 150° C. and then calcined at 500° C. for one hour to obtain a palladium-containing zirconium-cerium-lanthanum composite oxide (Powder B1).

Separately, 30 g of alumina ($\gamma$-$Al_2O_3$) having a specific surface area of 150 $m^2$/g was impregnated with an aqueous palladium nitrate solution containing 2 g of palladium, dried thoroughly at 150° C., and then calcined at 500° C. for one hour to obtain palladium-containing alumina.

In a ball mill pot, 32 g of the produced palladium-containing alumina, 35 g of Powder A1, 42 g of Powder B1, 45 g of alumina ($\gamma$-$Al_2O_3$) having a specific surface area of 150 $m^2$/g, 30 g equivalent of barium hydroxide as an oxide, 5 g of acetic acid, and 150 g of deionized water were placed together with the balls as the media and ball milled for 15 hours to obtain a water slurry.

A monolithic carrier made of cordierite (available from NGK Insulators Ltd. in Japan: cell density 400 cells/6.45 $cm^2$ (1 square inch), outside diameter 33 mm×76 mm in length) was impregnated with the resultant slurry, removed from the slurry, blown with compressed air to expel excess slurry, then dried at 150° C. for two hours, and calcined at 500° C. for one hour to obtain catalyst 1.

Example 2

A zirconium-cerium-lanthanum composite oxide (Powder A2) was obtained according to the procedure of Example 1 while changing the amounts of zirconium oxychloride, cerium, and lanthanum to be used so as to form a weight ratio of 25 g of zirconium oxide, 12.5 g of cerium oxide, and 9.5 g of lanthanum oxide.

Next, a palladium-containing zirconium-cerium-lanthanum composite oxide (Powder B2) was obtained according to the procedure of Example 1 while using 47 g of Powder A2 instead of 40 g of Powder A1.

In a ball mill, 49 g of Powder B2, 103 g of alumina ($\gamma$-$Al_2O_3$) having a specific surface area of 150 $m^2$/g, 10 g equivalent of barium hydroxide as an oxide, 5 g of acetic acid, and 150 g of deionized water were ball milled for 15 hours to form a water slurry. A monolithic carrier (supra) was coated with the slurry as in Example 1 to obtain catalyst 2.

Example 3

A palladium-containing zirconium-cerium-lanthanum composite oxide (Powder B3) was obtained by impregnating 47 g of Powder A1 with an aqueous palladium nitrate solution containing 2 g of palladium as in Example 1.

Separately, 10 g of alumina ($\gamma$-$Al_2O_3$) having a specific surface area of 150 $m^2$/g was impregnated with an aqueous rhodium nitrate solution containing 0.2 g of rhodium. Then, the impregnated alumina was thoroughly dried at 150° C. and calcined at 500° C. for one hour to obtain rhodium-containing alumina.

In a ball mill, 10.2 g of the rhodium-containing alumina, 28 g of Powder A1, 49 g of Powder B3, 65 g of alumina ($\gamma$-$Al_2O_3$) having a specific surface area of 150 $m^2$/g, 10 g equivalent of barium hydroxide as an oxide, 5 g of acetic acid, and 150 g of deionized water were ball milled for 15 hours to form a water slurry. A monolithic carrier (supra) was coated with the slurry as in Example 1 to obtain catalyst 3.

Example 4

Powder A1 was prepared as in Example 1. Next, a palladium-containing zirconium-cerium-lanthanum composite oxide (Powder B3) was obtained as in Example 3.

In a ball mill, 49 g of Powder B3, 43 g of alumina ($\gamma$-$Al_2O_3$) having a specific surface area of 150 $m^2$/g, 10 g equivalent of barium hydroxide as an oxide, 4 g of acetic acid, and 150 g of deionized water were ball milled for 15 hours to form a water slurry. A monolithic carrier (supra) was coated with the slurry as in Example 1 to obtain a Pd catalyst coat (C4).

Separately, 10.2 g of the rhodium-containing alumina obtained as Example 3, 13 g of Powder A1, 47 g of alumina ($\gamma$-$Al_2O_3$) having a specific surface area of 150 $m^2$/g, 5 g of acetic acid, and 126 g of deionized water were ball milled for 15 hours to form a water slurry.

The resultant slurry was coated to the Pd catalyst coat (C4) to obtain catalyst 4.

Example 5

A zirconium-cerium-lanthanum composite oxide (Powder A5) was prepared according to the procedure of Example 1 while changing the amounts of zirconium oxychloride, cerium, and lanthanum to be used so as to form a weight ratio of 40 g of zirconium oxide, 10 g of cerium oxide, and 10 g of lanthanum oxide.

A quantity of 47 g Powder A5 was impregnated with an aqueous palladium nitrate solution containing 2 g of palladium to obtain a palladium-containing zirconium-cerium-lanthanum composite oxide (Powder B5) as in Example 1.

In a ball mill, 10.2 g of the rhodium-containing alumina obtained as in Example 3, 13 g of Powder A5, 49 g of Powder B5, 80 g of alumina ($\gamma$-$Al_2O_3$) having a specific surface area of 150 $m^2$/g, 10 g equivalent of barium hydroxide as an oxide, 5 g of acetic acid, and 150 g of deionized water were ball milled for 15 hours to form a water slurry. A monolithic carrier (supra) was coated with the produced slurry as in Example 1 to obtain catalyst 5.

Example 6

Powders A5 and B5 were prepared as in Example 5.

In a ball mill, 49 g of Powder B5, 43 g of alumina ($\gamma$-$Al_2O_3$) having a specific surface area of 150 $m^2$/g, 10 g equivalent of barium hydroxide as an oxide, 5 g of acetic acid, and 150 g of deionized water were ball milled for 15 hours to form a water slurry. The slurry was coated to a monolithic carrier (supra) as in Example 4 to obtain a Pd catalyst coat (C6).

Separately, in a ball mill, 10.2 g of the rhodium-containing alumina obtained as in Example 3, 13 g of Powder A5, 47 g of alumina ($\gamma$-$Al_2O_3$) having a specific surface area of 150 $m^2$/g, 4 g of acetic acid, and 126 g of deionized water were ball milled for 15 hours to form a water slurry.

The produced slurry was coated to the Pd catalyst coat (C6) to obtain catalyst 6.

Example 7

A catalyst 7 was obtained according to the procedure of Example 6 while using, instead of 10.2 g of the rhodium-containing alumina, 10.4 g of platinum rhodium containing alumina obtained as in Example 3 by impregnating 10 g of alumina ($\gamma$-$Al_2O_3$) having a specific surface area of 150 $m^2$/g with an aqueous rhodium nitrate solution containing 0.2 g of rhodium and an aqueous platinum nitrate solution containing 0.2 g of platinum.

Comparative Examples 1 to 7

Catalysts were prepared according to the procedures of Examples 1 to 7, respectively, while, in the preparation of zirconium-cerium-lanthanum composite oxide, using the zirconium hydroxide obtained by hydrolyzing zirconium oxychloride having zirconium as a raw material having no tetragonal crystal structure of zirconium oxide instead of a corresponding amount of zirconium oxide. FIG. 2 shows crystal patterns other than the tetragonal crystal structure and is based on the material as in Comparative Example 1.

Comparative Examples 8 and 9

Catalysts were prepared according to the procedures of Examples 1 and 3, respectively, while using, instead of the zirconium-cerium-lanthanum composite oxide, the zirconium-cerium composite oxide obtained by adding an aqueous cerium nitrate solution to zirconium oxide so as to form a weight ratio of 40 g of zirconium oxide and 20 g of cerium oxide, mixing them together, drying, and calcining the resultant mixture. These composite oxides also showed crystal patterns other than the tetragonal crystal structure as shown in FIG. 2.

Comparative Example 10

A catalyst was prepared according to the procedure of Example 7 while using, instead of the zirconium-cerium-lanthanum composite oxide, the zirconium-cerium composite oxide obtained by adding an aqueous cerium nitrate solution to zirconium oxide so as to form a weight ratio of 25 g of zirconium oxide and 12.5 g of cerium oxide, mixing them together, drying, and calcining the resultant mixture.

The composite oxide also showed crystal patterns other than the tetragonal crystal structure as shown in FIG. 2.

TABLE 2

| | Amount of noble metal (g/L) | | | Amount of $ZrO_2/CeO_2/La_2O_3$ (g/L) | | | BaO |
|---|---|---|---|---|---|---|---|
| | Pd | Pt | Rh | $ZrO_2$ | $CeO_2$ | $La_2O_3$ | (g/L) |
| Ex. | | | | | | | |
| 1 | 4 | 0 | 0 | 40 | 20 | 15 | 30 |
| 2 | 2 | 0 | 0 | 25 | 12.5 | 9.5 | 10 |
| 3 | 2 | 0 | 0.2 | 40 | 20 | 15 | 10 |
| 4 | 2 | 0 | 0.2 | 40 | 20 | 15 | 10 |
| 5 | 2 | 0 | 0.2 | 40 | 10 | 10 | 10 |
| 6 | 2 | 0.3 | 0.2 | 40 | 20 | 15 | 10 |
| 7 | 0 | 0.1 | 0.2 | 25 | 12.5 | 9.5 | 0 |
| Com. Ex. | | | | | | | |
| 1 | 4 | 0 | 0 | 40 | 20 | 15 | 30 |
| 2 | 2 | 0 | 0 | 25 | 12.5 | 9.5 | 10 |
| 3 | 2 | 0 | 0.2 | 40 | 20 | 15 | 10 |
| 4 | 2 | 0 | 0.2 | 40 | 20 | 15 | 10 |
| 5 | 2 | 0 | 0.2 | 40 | 10 | 10 | 10 |
| 6 | 2 | 0.3 | 0.2 | 40 | 20 | 15 | 10 |
| 7 | 0 | 1.0 | 0.2 | 25 | 12.5 | 9.5 | 0 |
| 8 | 4 | 0 | 0 | 40 | 20 | 0 | 30 |
| 9 | 2 | 0 | 0.2 | 40 | 20 | 0 | 10 |
| 10 | 0 | 1.0 | 0.2 | 25 | 12.5 | 0 | 0 |

The catalysts obtained contained such amounts of catalyst components as shown in Table 1 per liter of structure.

Activity Performance

The catalysts obtained in Examples 1–7 and Comparative Examples 1–10 were left standing in an engine in operation and then rated for catalytic activity.

A commercially available electronically controlled engine was used. A multiple converter packed with given catalysts was set in the exhaust system of the engine to test the catalyst for durability.

The engine was operated in the mode of 60 seconds of stationary operation and 6 seconds of deceleration (during which period the fuel was cut and the catalyst was exposed to the high-temperature oxidation atmosphere) and the catalyst was left standing under the condition causing the temperature of the catalyst bed to remain at 900° C. for 50 hours during the stationary operation. After the duration, the catalyst was rated for performance by using the engine and setting, in the exhaust system of the engine, the multiple converters. The three-way performance of the catalyst was rated under the condition of 400° C. of catalyst inlet and 250,000 $hr^{-1}$ of spatial velocity. In this case, the average air-fuel ratio was continuously varied by fluctuating the air-fuel ratio (A/F) within ±1.0 A/F at 1 Hz by dint of a 1 Hz sine wave signal introduced from an external oscillator into the control unit of the engine. In this manner, the inlet and outlet gas compositions of the catalyst were simultaneously analyzed to determine the purification ratios of CO, HC, and $NO_X$ during the change of the average air-fuel ratio, A/F, from 15.1 to 14.1.

By graphically plotting the purification ratios vs. the air-fuel ratios respectively of CO, HC, and $NO_X$ found as described above, a three-way property curve was formed. Table 3 shows the purification ratios at the crossover points of CO and $NO_X$ and the purification ratios of HC for the A/F values at the points.

Then, the purification of the catalyst at low temperatures was rated by operating the engine with the air-fuel ratio fluctuated within ±0.5 A/F (1 Hz) by the oscillation of the gas to fix the average air-fuel ratio, A/F, at 14.6, setting a heat exchanger in front of the catalyst converter in the engine exhaust system, varying the catalyst inlet gas temperature from 200° C. to 500° C. at a fixed temperature increasing rate (20° C./min), and analyzing the catalyst inlet and outlet gas compositions thereby determining the purification ratios of CO, HC, and $NO_X$. The temperature at which the purification ratio of CO, HC, and $NO_X$ reached 50% (light off temperature) was measured, respectively, and shown in Table 3.

TABLE 3

| | Conversion efficiencies (%) at inlet temperature of 400° C. and A/F = 14.6 | | | Light off temperature (° C.) | | |
|---|---|---|---|---|---|---|
| | CO | HC | NOx | CO | HC | NOx |
| Example | | | | | | |
| 1 | 85 | 82 | 84 | 350 | 355 | 354 |
| 2 | 80 | 78 | 80 | 362 | 365 | 363 |
| 3 | 83 | 81 | 82 | 355 | 359 | 356 |
| 4 | 89 | 88 | 89 | 350 | 353 | 349 |
| 5 | 80 | 79 | 79 | 354 | 358 | 356 |
| 6 | 91 | 89 | 90 | 347 | 351 | 346 |
| 7 | 86 | 83 | 85 | 359 | 362 | 357 |
| Com. Ex. | | | | | | |
| 1 | 76 | 79 | 75 | 357 | 360 | 358 |
| 2 | 72 | 76 | 71 | 371 | 374 | 372 |
| 3 | 74 | 78 | 73 | 362 | 363 | 363 |
| 4 | 81 | 85 | 80 | 356 | 358 | 354 |
| 5 | 71 | 76 | 70 | 363 | 364 | 364 |
| 6 | 83 | 86 | 83 | 354 | 357 | 352 |
| 7 | 78 | 80 | 77 | 367 | 368 | 365 |
| 8 | 71 | 76 | 70 | 361 | 363 | 362 |
| 9 | 68 | 75 | 67 | 365 | 367 | 367 |
| 10 | 76 | 75 | 76 | 368 | 370 | 366 |

NOx was analyzed with a chemical emission spectral analyzer (CLD) and the hydrocarbon with a hydrogen flame ionizing analyzer (NDIR) respectively.

It is noted from Table 3 that the catalyst of this invention was capable of simultaneously and efficiently removing the three components, CO, HC, and $NO_X$. It is also noted that this catalyst was improved in heat resistant property as compared with the conventional catalyst.

The entire disclosure of Japanese Patent Application No. 2000-192934 filed on Jun. 27, 2000 including specification, claims, drawings and summary are incorporated herein by reference in its entirety.

What is claimed is:

1. An exhaust gas purifying catalyst comprising:

a catalytically active component comprising at least one kind of noble metals, a refractory inorganic oxide, and a zirconium oxide containing cerium and lanthanum; and a refractory three-dimensional structure coated with the catalytically active component;

wherein said zirconium oxide containing cerium and lanthanum has a tetragonal crystal structure of zirconium oxide, a weight ratio of cerium as $CeO_2$ to zirconium as $ZrO_2$ in the range of 1:8 to 1:1, and a weight ratio of lanthanum as $La_2O_3$ to zirconium as $ZrO_2$ in the range of 1:1.5 to 1:60.

2. A catalyst according to claim 1, wherein the noble metal is at least one member selected from the group consisting of palladium, platinum, rhodium and a mixture thereof.

3. A catalyst according to claim 1, wherein the refractory inorganic oxide is at least one member selected from the group consisting of alumina, titania, zirconia, silica, alumina-titania, alumina-zirconia, titania-zirconia and a mixture thereof.

4. A catalyst according to claim 1, wherein an amount of the noble metal comprises from 0.05 to 30 g per liter of said structure.

5. A catalyst according to claim 4, wherein the amount of the noble metal comprises from 0.15 to 20 g per liter of said structure.

6. A catalyst according to claim 1, wherein an amount of the refractory inorganic oxide comprises from 10 to 300 g per liter of the structure.

7. A catalyst according to claim 6, wherein the amount of the refractory inorganic oxide comprises from 50 to 250 g per liter of the structure.

8. A catalyst according to claim 1, wherein an amount of the zirconium oxide containing cerium and lanthanum comprises from 5 to 250 g per liter of the structure.

9. A catalyst according to claim 8, wherein the amount of the zirconium oxide containing cerium and lanthanum comprises from 10 to 200 g per liter of the structure.

10. A catalyst according to claim 1, wherein the weight ratio of cerium as $CeO_2$ to zirconium as $ZrO_2$ is in the range of 1:5 to 1:1.

11. A catalyst according to claim l, wherein the weight ratio of lanthanum as $La_2O_3$ to zirconium as $ZrO_2$ is in the range of 1:1.5 to 1:40.

12. A catalyst according to claim 1, which further comprises an alkaline earth metal oxide.

13. A catalyst according to claim 12, wherein the alkaline earth metal oxide includes the oxides of barium, magnesium, calcium, strontium or a mixture thereof.

14. A catalyst according to claim 12, wherein an amount of the alkaline earth metal oxide is in the range of 0.1 to 50 g per liter of the structure.

15. A catalyst according to claim 14, wherein the amount of the alkaline earth metal oxide is in the range of 1 to 30 g per liter of the structure.

16. A method for simultaneous purification of carbon monoxide, hydrocarbon, and nitrogen oxide contained in the exhaust gas emitted from an internal combustion engine by the use of an exhaust gas purifying catalyst comprising: a catalytically active component comprising at least one kind of noble metals, a refractory inorganic oxide, and a zirconium oxide containing cerium and lanthanum; and a refractory three-dimensional structure coated with the catalytically active component; wherein said zirconium oxide containing cerium and lanthanum has a crystal structure of a tetragonal structure of zirconium oxide, a weight ratio of cerium as $CeO_2$ to zirconium as $ZrO_2$ in the range of 1:8 to 1:1, and a weight ratio of lanthanum as $La_2O_3$ to zirconium $ZrO_2$ in the range of 1:1.5 to 1:60.

* * * * *